(12) United States Patent
Modica et al.

(10) Patent No.: US 9,483,939 B2
(45) Date of Patent: Nov. 1, 2016

(54) METHOD AND APPARATUS FOR PROVIDING TRAFFIC FLOW SIGNALING

(71) Applicant: HERE Global B.V., Veldhoven (NL)

(72) Inventors: Leo Modica, Sawyer, MI (US); Leon Stenneth, Chicago, IL (US)

(73) Assignee: HERE GLOBAL B.V., Veldhoven (NL)

( * ) Notice: Subject to any disclaimer, the term of this patent is extended or adjusted under 35 U.S.C. 154(b) by 0 days.

(21) Appl. No.: 14/640,388

(22) Filed: Mar. 6, 2015

(65) Prior Publication Data

US 2016/0260325 A1    Sep. 8, 2016

(51) Int. Cl.
| | |
|---|---|
| G06F 19/00 | (2011.01) |
| G08G 1/07 | (2006.01) |
| H04W 4/04 | (2009.01) |
| G08G 1/01 | (2006.01) |

(52) U.S. Cl.
CPC .............. *G08G 1/07* (2013.01); *G08G 1/0125* (2013.01); *H04W 4/046* (2013.01)

(58) Field of Classification Search
USPC .......................................... 701/118; 340/910
See application file for complete search history.

(56) References Cited

U.S. PATENT DOCUMENTS

| | | | | |
|---|---|---|---|---|
| RE31,044 E | * | 9/1982 | McReynolds | G08G 1/082 340/913 |
| 4,370,718 A | * | 1/1983 | Chasek | G08G 1/08 340/911 |
| 5,357,436 A | * | 10/1994 | Chiu | G08G 1/081 340/916 |
| 8,050,854 B1 | * | 11/2011 | Chandra | G08G 1/081 340/917 |
| 8,618,954 B2 | * | 12/2013 | Free | G08G 1/0104 340/540 |
| 8,989,996 B1 | * | 3/2015 | Kavaler | G08G 1/0104 340/933 |
| 2005/0209772 A1 | * | 9/2005 | Yoshikawa | G08G 1/096827 340/995.13 |

(Continued)

OTHER PUBLICATIONS

California Path Program Institute of Transportation Studies, "Investigating the Potential Benefits of Broadcasted Signal Phase and Timing (SPaT) Data under IntelliDrive", May 20, 2011, retrieved from http://www.cts.virginia.edu/wp-content/uploads/2014/04/PFS_SPAT99_Final.pdf, 98 pages.

*Primary Examiner* — Thomas G Black
*Assistant Examiner* — Tyler Paige
(74) *Attorney, Agent, or Firm* — Ditthavong & Steiner, P.C.

(57) ABSTRACT

An approach is provided for synchronizing traffic flow and/or traffic signals in alternate travel segments. The approach involves determining traffic congestion information for at least one travel segment that is classified in at least one first functional class. The approach also involves processing and/or facilitating a processing of the traffic congestion information to determine at least one alternate travel segment that is classified in at least one second functional class. The approach further involves determining at least one calculated traffic flow for the at least one alternate travel segment based, at least in part, on traffic flow information associated with the at least one first functional class. The approach also involves causing, at least in part, a configuration of one or more traffic signaling parameters for the at least one alternate travel segment based, at least in part, on the calculated traffic flow.

20 Claims, 12 Drawing Sheets

(56) References Cited

U.S. PATENT DOCUMENTS

| | | | |
|---|---|---|---|
| 2007/0244627 A1* | 10/2007 | Boss | G08G 1/0104 701/117 |
| 2008/0004802 A1* | 1/2008 | Horvitz | G01C 21/3415 701/533 |
| 2010/0017103 A1* | 1/2010 | Kwong | G08G 1/0104 701/117 |
| 2010/0254282 A1* | 10/2010 | Chan | H04W 24/08 370/253 |
| 2013/0013179 A1 | 1/2013 | Lection et al. | |
| 2013/0018574 A1 | 1/2013 | Adler | |
| 2013/0063282 A1 | 3/2013 | Baldwin et al. | |
| 2013/0099942 A1* | 4/2013 | Mantalvanos | G08G 1/082 340/910 |
| 2013/0289862 A1 | 10/2013 | Chapman et al. | |
| 2014/0012498 A1* | 1/2014 | Gustafson | G01C 21/3423 701/468 |
| 2014/0278052 A1* | 9/2014 | Slavin | G01C 21/3492 701/400 |
| 2015/0066340 A1* | 3/2015 | Nelson | G08G 1/095 701/117 |

* cited by examiner

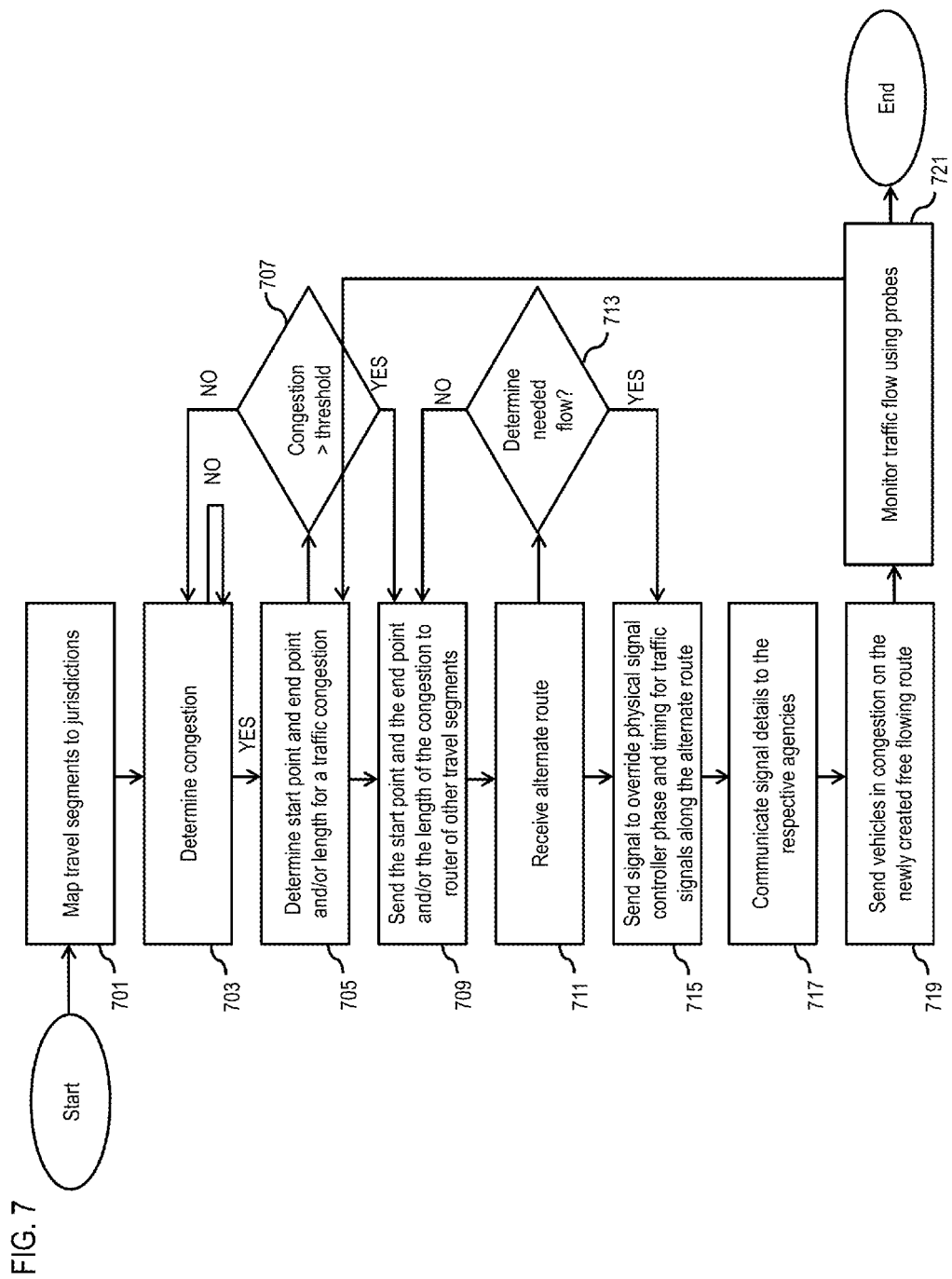

METHOD AND APPARATUS FOR PROVIDING TRAFFIC FLOW SIGNALING

BACKGROUND

Service providers and device manufacturers (e.g., wireless, cellular, etc.) are continually challenged to deliver value and convenience to consumers by, for example, providing compelling network services. One area of interest has been implementation of location sensing services and mapping technologies to provide device users with alternate travel segments during traffic congestion. However, the service providers and developers face significant technical challenges in manipulating traffic signals in real-time in alternate travel segments to provide a proactive traffic management during congestion.

SOME EXAMPLE EMBODIMENTS

Therefore, there is a need for an approach for synchronizing traffic flow and/or traffic signals in alternate travel segments.

According to one embodiment, a method comprises determining traffic congestion information for at least one travel segment that is classified in at least one first functional class. The method also comprises processing and/or facilitating a processing of the traffic congestion information to determine at least one alternate travel segment that is classified in at least one second functional class. The method further comprises determining at least one calculated traffic flow for the at least one alternate travel segment based, at least in part, on traffic flow information associated with the at least one first functional class. The method also comprises causing, at least in part, a configuration of one or more traffic signaling parameters for the at least one alternate travel segment based, at least in part, on the calculated traffic flow.

According to another embodiment, an apparatus comprises at least one processor, and at least one memory including computer program code for one or more computer programs, the at least one memory and the computer program code configured to, with the at least one processor, cause, at least in part, the apparatus to determine traffic congestion information for at least one travel segment that is classified in at least one first functional class. The apparatus is also caused to process and/or facilitate a processing of the traffic congestion information to determine at least one alternate travel segment that is classified in at least one second functional class. The apparatus is further caused to determine at least one calculated traffic flow for the at least one alternate travel segment based, at least in part, on traffic flow information associated with the at least one first functional class. The apparatus is also caused to cause, at least in part, a configuration of one or more traffic signaling parameters for the at least one alternate travel segment based, at least in part, on the calculated traffic flow.

According to another embodiment, a computer-readable storage medium carries one or more sequences of one or more instructions which, when executed by one or more processors, cause, at least in part, an apparatus to determine traffic congestion information for at least one travel segment that is classified in at least one first functional class. The apparatus is also caused to process and/or facilitate a processing of the traffic congestion information to determine at least one alternate travel segment that is classified in at least one second functional class. The apparatus is further caused to determine at least one calculated traffic flow for the at least one alternate travel segment based, at least in part, on traffic flow information associated with the at least one first functional class. The apparatus is also caused to cause, at least in part, a configuration of one or more traffic signaling parameters for the at least one alternate travel segment based, at least in part, on the calculated traffic flow.

According to another embodiment, an apparatus comprises means for determining traffic congestion information for at least one travel segment that is classified in at least one first functional class. The apparatus also comprises means for processing and/or facilitating a processing of the traffic congestion information to determine at least one alternate travel segment that is classified in at least one second functional class. The apparatus further comprises means for determining at least one calculated traffic flow for the at least one alternate travel segment based, at least in part, on traffic flow information associated with the at least one first functional class. The apparatus also comprises means for causing, at least in part, a configuration of one or more traffic signaling parameters for the at least one alternate travel segment based, at least in part, on the calculated traffic flow.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is a flowchart of a process for synchronizing traffic flow and/or traffic signals in alternate travel segments, according to one embodiment;

DESCRIPTION OF SOME EMBODIMENTS

Examples of a method, apparatus, and computer program for synchronizing traffic flow and/or traffic signals in alternate travel segments are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to determining an alternate route in one or more low function class roads by overriding and/or adjusting signal phase and timing parameters, speed information, variable sign messages, or a combination thereof based, at least in part, on the traffic information in at least one high function class road. It is contemplated that the approach described herein may also be used with respect to determining an alternate route in one or more high function class road from one or more low function class roads by overriding and/or adjusting signal phase and timing parameters, speed information, variable sign messages, or a combination thereof based, at least in part, on the traffic information in at least one low function class road.

Figure 1:
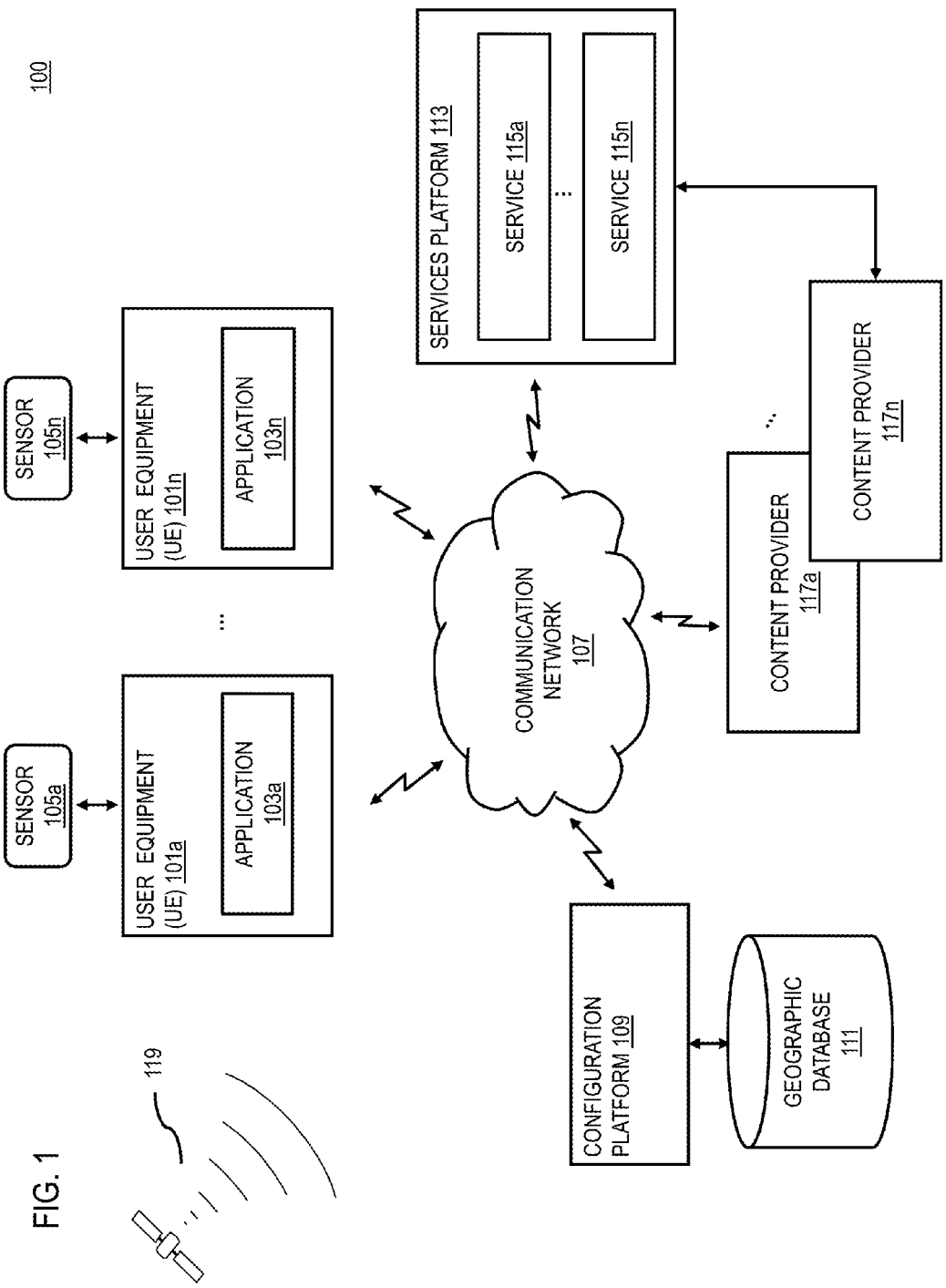
FIG. 1 is a diagram of a system capable of synchronizing traffic flow and/or traffic signals in alternate travel segments, according to one embodiment.

FIG. 1 is a diagram of a system capable of synchronizing traffic flow and/or traffic signals in alternate travel segments, according to one embodiment. In one scenario, travel segments are grouped into classes in accordance with the character of services they provide. For example, highways are classified as high function class roads (e.g., functional class 1 and 2) whilst arterial streets and alleys are classified as low function class roads (e.g., e.g., functional class 3, 4 and 5 respectively). However, there are no services that improve the traffic flow during congestion on high function class roads.

To address this problem, a system 100 of FIG. 1 introduces the capability to find alternate routes along the low function class roads during congestion on high function class roads. The system 100 makes the alternate route continuous by overriding and adjusting the Signal Phase and Timing (SPaT) parameters of physical signal controllers deployed in the low function class road network using a virtual signal controller (e.g., controller 309). In one embodiment, a virtual signal controller runs outside the traditional controllers physically installed at intersections. The virtual signal controller runs a server in the internet (public or private). The virtual signal controller may overwrite the traffic controllers, and may update the speed limits and variable message signs along the low function class roads. In one example embodiment, if speed limits on the low function class roads were 40 KPH, after the re-routing they would be increased to 80 KPH to obtain the needed traffic flow. In another embodiment, the system 100 provides proactive traffic management through the use of SPaT data by causing a temporary shift towards low function class roads by manipulating traffic signal duration and sequencing. The system 100 is not resolving traffic congestion (the cause of congestion), but improving the traffic flow during the congestion. In one scenario, the strategy for improving the traffic flow involves providing a continuous free flowing alternate route on low function roads (e.g., arterial streets) by influencing or overwriting the signal controllers (e.g., making the signals continuously green). In another scenario, the system 100 may use pulsing yellow (e.g., pulse on 3 seconds intervals) to indicate a signal has been overridden for congestion control and drivers should exercise caution due to heavy traffic.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a configuration platform 109 via the communication network 107. In one embodiment, the configuration platform 109 performs one or more functions associated with synchronizing traffic flow and/or traffic signals in alternate travel segments.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

By way of example, the applications 103 may be any type of application that is executable at the UE 101, such as a virtual controller, a mapping application (e.g., link-based traffic flow representation, heat-map representation), location-based service applications, navigation applications, content provisioning services, camera/imaging application, media player applications, social networking applications, calendar applications, and the like. In one embodiment, one of the applications 103 at the UE 101 may act as a client for the configuration platform 109 and perform one or more functions associated with the functions of the configuration platform 109 by interacting with the configuration platform 109 over the communication network 107. In one scenario, the virtual controllers may adjust the SPaT parameters of the next phase for each physical controller and the variable message signs to optimize traffic flow (and safety) along the alternate arterial route(s) in real time.

By way of example, the sensors 105 may be any type of sensor. In certain embodiments, the sensors 105 may include, for example, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis and documentation purposes), an audio recorder for gathering audio data, loop detector sensor, and the like. In another embodiment, the sensors 105 may include light sensors, orientation sensors augmented with height sensor and acceleration sensor (e.g., an accelerometer can measure acceleration and can be used to determine orientation of the UE 101), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, traffic lights, and any other objects, or a combination thereof. In one scenario, the sensors 105 may detect weather data, traffic information, or a combination thereof. In one example embodiment, the UE 101 may include GPS receivers to obtain geographic coordinates from satellites 119 for determining current location and time associated with the UE 101. Further, the location can be determined by a triangulation system such as A-GPS, Cell of Origin, or other location extrapolation technologies. In another example embodiment, the one or more sensors may provide in-vehicle navigation services, wherein one or more location based services may be provided to the at least one UE 101 associated with the at least one user of the vehicle and/or at least one other UE 101 associated with the at least one vehicle.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the configuration platform 109 may be a platform with multiple interconnected components. The configuration platform 109 may include multiple servers, intelligent networking devices, computing devices, components and corresponding software for synchronizing traffic flow and/or traffic signals in alternate travel segments are disclosed. In addition, it is noted that the configuration platform 109 may be a separate entity of the system 100, a part of the one or more services 115a-115n (collectively referred to as services 115) of the services platform 113, or included within the UE 101 (e.g., as part of the applications 103.

In one embodiment, the configuration platform 109 may determine traffic congestion information for one or more travel segments classified as first functional class. Then, the configuration platform 109 may process the traffic congestion information to determine one or more alternate travel segments classified as second functional class. Subsequently, the configuration platform 109 may determine calculated traffic flow for the one or more alternate travel segments based on the traffic flow information associated with the first functional class. Then, the configuration platform 109 may cause a configuration of one or more traffic signaling parameters for the one or more alternate travel segments based on the calculated traffic flow. In one scenario, the configuration platform 109 may determine an alternate route (s) based on various sensor inputs and road network capacities. In one embodiment, the configuration platform 109 may implement virtual signal controller (e.g., controller 309) to improve traffic flow during congestion in one or more high class roads. The virtual signal controller runs outside the traditional controllers physically installed at intersections or side of road (e.g., variable message signs (VMS)). Basically, it runs a server in the internet (public or private). These virtual signal controllers may use network optimization algorithm to influence or override physical signal controllers deployed in the road network. In one scenario, the virtual signal controllers may work in real-time to adjust the SPaT parameters of the next phase for each physical controller to optimize traffic flow (and safety) along the alternate route(s). Effectively, the broader range of physical signal controllers can adapt in a coordinated manner to abnormal traffic conditions. In one scenario, there may be more than just one alternate route, the configuration platform 109 may determine multiple alternate routes well ahead of the traffic congestion. Then, the configuration platform 109 may distribute traffic over multiple alternate routes to maximize traffic flow. In one scenario, the configuration platform 109 may process one or more policies on traffic rules and regulations for each jurisdiction. Since, each jurisdiction may have special rules on when to route, how to route, etc., the configuration platform 109 may collect this data ahead of time.

In one embodiment, the configuration platform 109 may control traffic signals and variable message signs in a coordinated manner after detection of traffic congestion. In another embodiment, the configuration platform 109 may control traffic signals and variable message signs in a coordinated manner, when the traffic signals and variable message signs are in different jurisdictions (i.e. managed by different DOT agencies such as state, county and local). In one scenario, managing traffic signals and variable message signs across jurisdictions requires coordination and/or communication with the Traffic Management Centers (TMCs). Therefore, it is important for the configuration platform 109 to know which travel segment is managed by which TMC. In another scenario, the configuration platform 109 may communicate the phase and timing of signals to each agency so they can control the individual signals. After the alternative route is provided, the configuration platform 109 monitors the flow using sensors 105 (e.g., GPS enabled vehicles (probes), loop detectors, cameras, etc.) and make necessary adjustments.

In one embodiment, the geographic database 111 may store attributes for one or more travel segments (e.g., traffic information, speed information, etc.) in at least one travel segment. The information may be any multiple types of information that can provide means for aiding in the content provisioning and sharing process.

The services platform 113 may include any type of service. By way of example, the services platform 113 may include mapping services, navigation services, travel planning services, notification services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the configuration platform 109 and the content provider 117 to supplement or aid in the processing of the content information.

By way of example, the services 115 may be an online service that reflects interests and/or activities of users. The services 115 allow users to share location information, activities information, contextual information, historical user information and interests within their individual networks, and provides for data portability. The services 115 may additionally assist in providing the configuration platform 109 with information on travel plans of at least one user, activity information for at least one user, speed information for at least one user, user profile information, and a variety of additional information.

The content providers 117a-117n (collectively referred to as content provider 117) may provide content to the UE 101, the configuration platform 109, and the services 115 of the services platform 113. The content provided may be any type of content, such as, image content (e.g., maps), textual content, audio content, video content, etc. In one embodiment, the content provider 117 may provide content that may supplement content of the applications 103, the sensors 105, or a combination thereof. By way of example, the content provider 117 may provide content that may aid in presenting comprehensible representation of alternate routes, traffic lights and speed information in alternate routes, etc. In one embodiment, the content provider 117 may also store content associated with the UE 101, the configuration platform 109, and the services 115 of the services platform 113. In another embodiment, the content provider 117 may manage access to a central repository of data, and offer a consistent, standard interface to data, such as, a repository of attributes for one or more travel segments, traffic information (e.g., traffic lights), speed information, or a combination thereof. Any known or still developing methods, techniques or processes for presenting comprehensible representation of traffic flow information may be employed by the configuration platform 109.

By way of example, the UE 101, the configuration platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
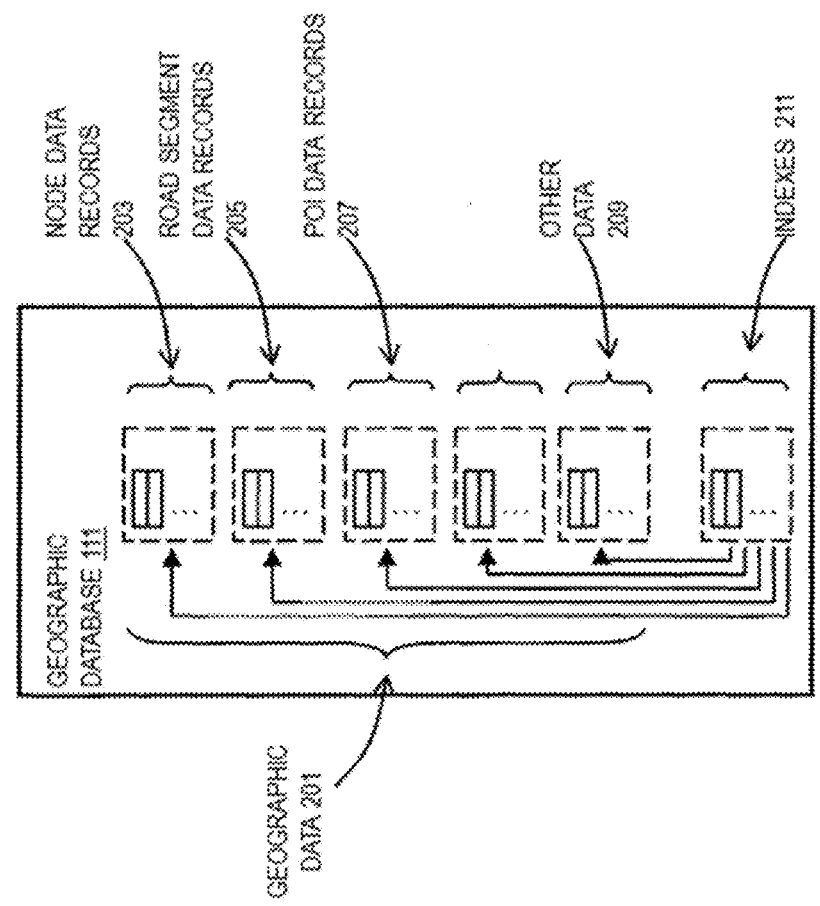
FIG. 2 is a diagram of the geographic database 111 of system 100, according to exemplary embodiments.

FIG. 2 is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic database 111 includes geographic data 201 used for (or configured to be compiled to be used for) mapping and/or navigation-related services, such as for personalized route determination, according to exemplary embodiments. For example, the geographic database 111 includes node data records 203, road segment or link data records 205, POI data records 207, and other data records 209, for example. More, fewer or different data records can be provided. In one embodiment, the other data records 209 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 205 are links or segments representing roads, streets, or paths, as can be used in the calculated route or recorded route information for determination of one or more personalized routes, according to exemplary embodiments. The node data records 203 are end points corresponding to the respective links or segments of the road segment data records 205. The road link data records 205 and the node data records 203 represent a road network, such as used by vehicles, cars, and/or other entities. Alternatively, the geographic database 111 can contain path segment and node data records or other data that represent pedestrian paths or areas in addition to or instead of the vehicle road record data, for example.

The road link/segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 207. The geographic database 111 can also include data about places, such as cities, towns, or other communities, and other geographic features, such as bodies of water, mountain ranges, etc. Such place or feature data can be part of the POI data records 207 or can be associated with POIs or POI data records 207 (such as a data point used for displaying or representing a position of a city). By way of example, a street is determined from the user interaction with the UE 101 and the content information associated with UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UE 101) to provided navigation-related functions. For example, the geographic database 111 can be used with the end user device UE 101 to provide an end user with navigation features. In such a case, the geographic database 111 can be downloaded or stored on the end user device UE 101, such as in applications 103, or the end user device UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for determination of route information to at least one identified alternate travel segment, according to exemplary embodiments.

Figure 3:
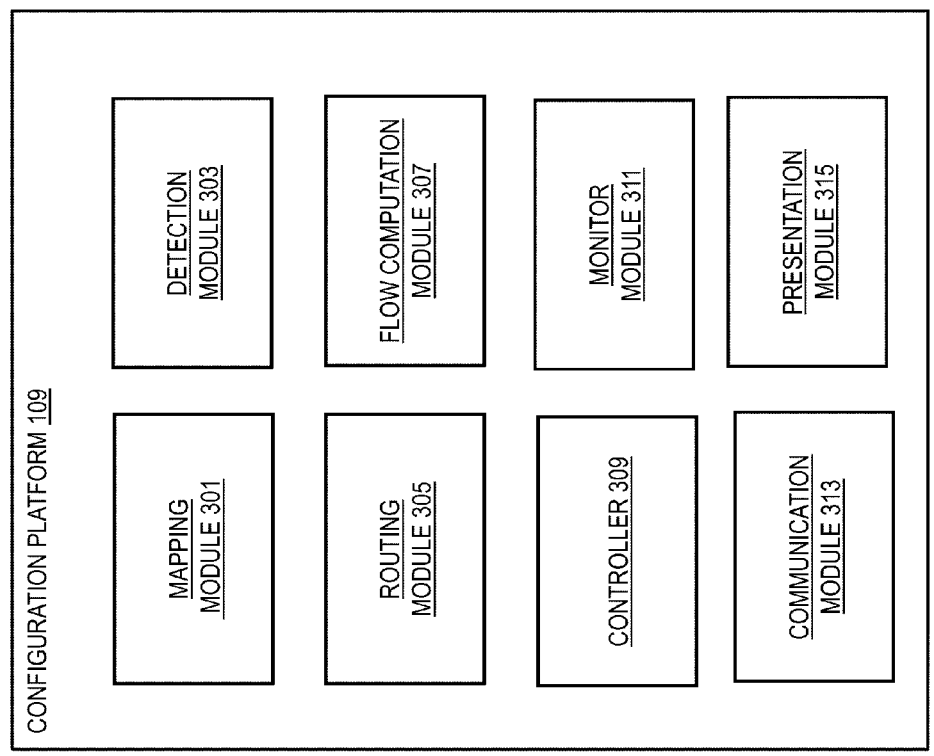
FIG. 3 is a diagram of the components of the configuration platform 109, according to one embodiment.

FIG. 3 is a diagram of the components of the configuration platform 109, according to one embodiment. By way of example, the configuration platform 109 includes one or more components for synchronizing traffic flow and/or traffic signals in alternate travel segments. It is contemplated that the functions of these components may be combined in one or more components or performed by other components of equivalent functionality. In this embodiment, the configuration platform 109 includes a mapping module 301, a detection module 303, a routing module 305, a flow computation module 307, a controller 309, a monitor module 311, a communication module 313, and a presentation module 315.

In one embodiment, the mapping module 301 may cause a mapping of one or more travel segments to their respective jurisdictions. In one scenario, the mapping module 301 may link at least one travel segment to at least one authority in a geographic region. In one scenario, the geographic authorities may include department of transportation (DOT), city and/or state wide traffic agencies, TMCs, etc.

In one embodiment, the detection module 303 may detect traffic congestion in at least one travel segment (e.g., a high function class road). In one scenario, the detection module 303 may determine traffic jam in at least one travel segment based, at least in part, on a determination that the speed information for one or more vehicles is below a predetermined speed threshold. In another embodiment, the detection module 303 may compute total length of traffic congestion in at least one travel segment (e.g., high function class road). In a further embodiment, the detection module 303 may record at least one starting point, at least one ending point, or a combination thereof for a traffic jam in the at least one travel segment based, at least in part, on a determination that the total length for a traffic jam is above a predetermined length threshold.

In one embodiment, the routing module 305 may compute an alternate route in at least one travel segment (e.g., a low function class road). In one scenario, the routing module 305 may determine an alternate route in arterial road links based, at least in part, on a determination that the vehicle speed in a highway is below a predetermined speed threshold. In another scenario, the routing module 305 may determine an alternate route in arterial road links based, at least in part, on a determination that the total length of traffic congestion in a highway is above a predetermined length threshold. In another embodiment, the routing module 305 may cause a re-routing of the one or more vehicles to one or more low function class roads based, at least in part, on the at least one starting point, the at least one ending point, or a combination thereof of a traffic congestion. In one scenario, the routing module 305 may determine an alternate route in the at least one low function class road based, at least in part, on sensor information, road network capability information, proximity information, or a combination thereof. In another scenario, the routing module 305 may determine other alternate routes in one or more low function class roads based, at least in part, on a determination that the traffic speed information for the at least one low function class road cannot be ascertained, coordinated, controlled, or a combination thereof.

In one embodiment, the flow computation module 307 may compute necessary traffic flow (e.g., vehicular speed) that should be maintained on alternate travel segments (e.g., low function class roads) for user convenience and safety. In one scenario, the flow computation module 307 may receive traffic speed information on one or more travel segments (e.g., high function class roads) from the monitor module 311. Then, the flow computation module 307 may determine a suitable traffic speed for the at least one alternate travel segment (e.g., low function class roads) during transitioning of the one or more vehicles from the at least one high function class road to the at least one low function class road. In such manner, the flow computation module 307 ensures the traffic flow in the high function class road and the one or more alternate low function class roads is similar.

In one embodiment, the controller 309 may control traffic signals in one or more alternate routes. In one scenario, the controller 309 may override and/or an adjust signal phase and signal timing parameters in at least one alternate low function class road. In one scenario, the controller 309 may adjust the signal phase and signal timing in real-time for at least one physical signal controller associated with the at least one low function class road to synchronize the traffic speed with the high function class road. In another scenario, the controller 309 may cause coordination amongst one or more physical signal controllers associated with one or more low function class roads to synchronize their traffic speed with the high function class road.

In one embodiment, the monitor module 311 may monitor the flow of traffic on the newly created route to ensure that the flow is comparable to the traffic flow in the at least one high function class road. In one scenario, the monitor module 311 may monitor the traffic speed information in the at least one high function class road based, at least in part, on probe data received from one or more vehicles in the at least one high function class road. The monitored data may be transmitted via the communication module 313 to the flow computation module 307 and the controller 309 to cause an adjustment in the signal phase and timing parameters, the speed information, the variable message signs, or a combination thereof in the at least one low function class road.

In one embodiment, the communication module 313 may control the communication of information between the system, the agencies, and the one or more vehicles. In one scenario, the communication module 313 may alert the geographic authorities by communicating the signal phase and timing parameters, the speed information, the variable message sign, or a combination thereof. In another scenario, the communication module 313 may cause a notification to one or more vehicles in the at least one high function class road regarding the alternate route in the at least one low function class road. In one example embodiment, the communication module 313 may communicate with vehicles, signal controllers, geographic authorities, or a combination thereof by using flashing yellow traffic signal.

In one embodiment, the presentation module 315 may obtains a set of summary statistics from the other modules. Then, the presentation module 315 continues with generating a presentation of one or more alternate arterial roads. In one scenario, the presentation module 315 may cause a colorful presentation wherein at least one alternate arterial road may be highlighted. In another scenario, the presentation module 315 may enable presentation of a graphical user interface for displaying map images in connection with a selected route.

The above presented modules and components of the configuration platform 109 can be implemented in hardware, firmware, software, or a combination thereof. Though depicted as a separate entity in FIG. 1, it is contemplated that the configuration platform 109 may be implemented for direct operation by respective UE 101. As such, the configuration platform 109 may generate direct signal inputs by way of the operating system of the UE 101 for interacting with the applications 103. In another embodiment, one or more of the modules 301-315 may be implemented for operation by respective UEs, as a configuration platform 109, or combination thereof. Still further, the configuration platform 109 may be integrated for direct operation with the services 115, such as in the form of a widget or applet, in accordance with an information and/or subscriber sharing arrangement. The various executions presented herein contemplate any and all arrangements and models.

Figure 4:
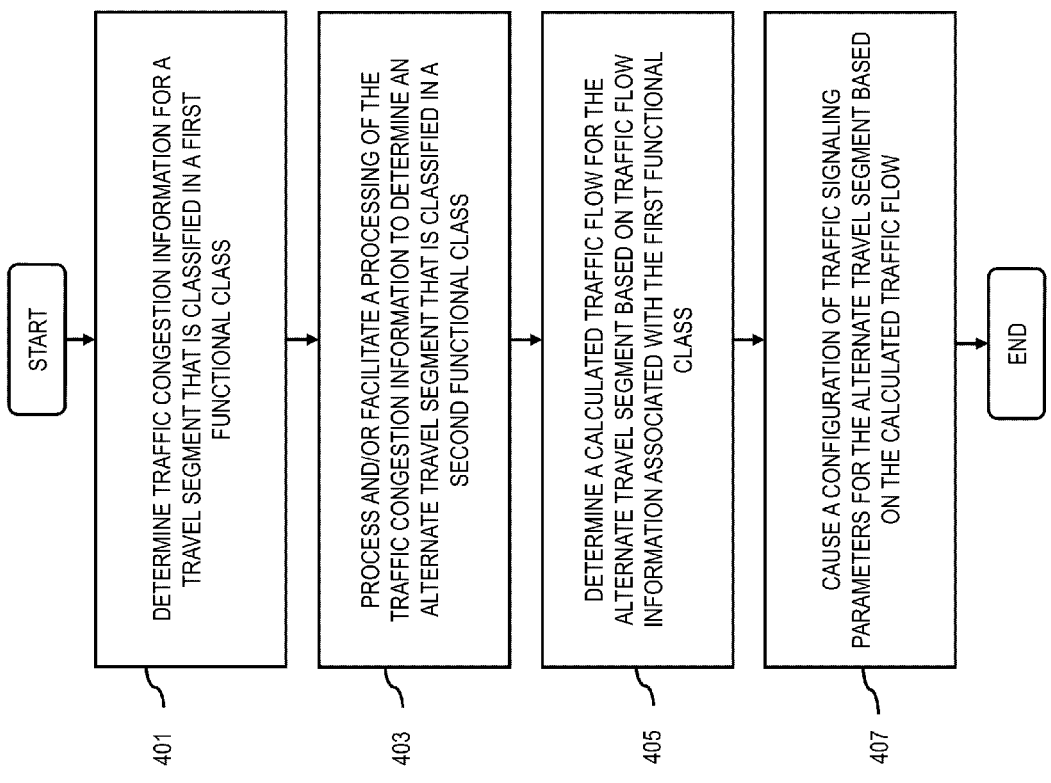
FIG. 4 is a flowchart of a process for synchronizing traffic flow and/or traffic signals in alternate travel segments, according to one embodiment.
Figure 10:
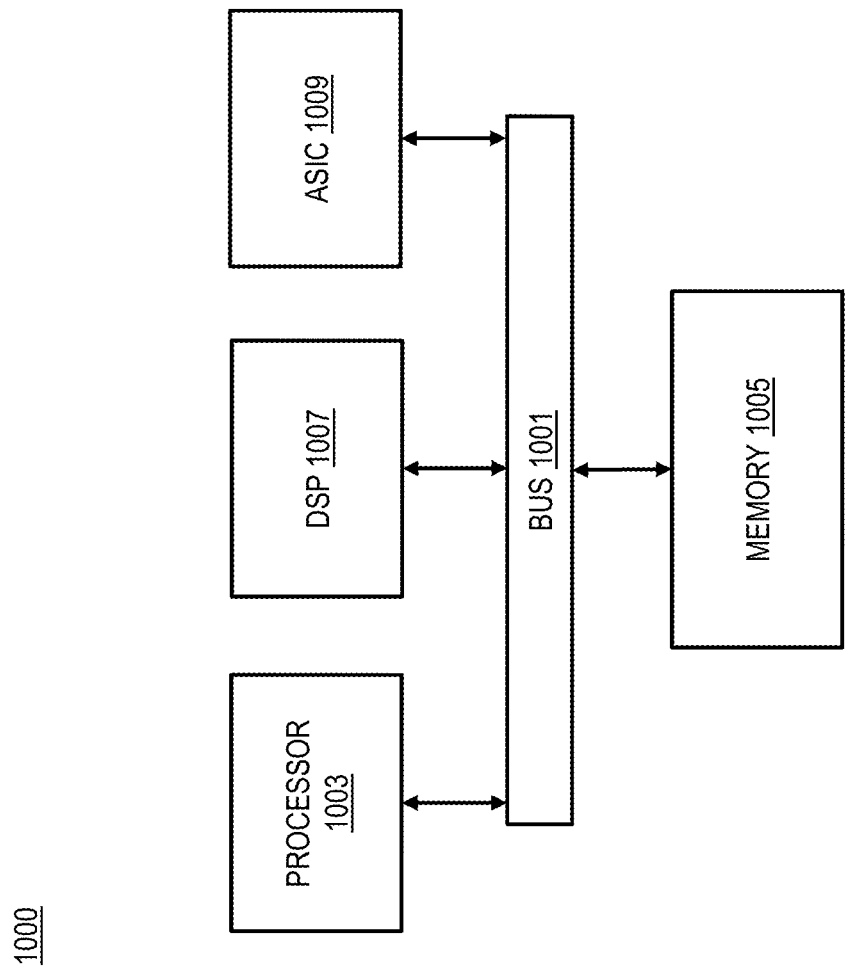
FIG. 10 is a diagram of a chip set that can be used to implement an embodiment of the invention.

FIG. 4 is a flowchart of a process for synchronizing traffic flow and/or traffic signals in alternate travel segments, according to one embodiment. In one embodiment, the configuration platform 109 performs the process 400 and is implemented in, for instance, a chip set including a processor and a memory as shown in FIG. 10.

In step 401, the configuration platform 109 may determine traffic congestion information for at least one travel segment that is classified in at least one first functional class. In one embodiment, the at least one first functional class is associated with one or more highways. In one scenario, the configuration platform 109 may receive traffic information (e.g., speed information, congestion information, etc.) for at least one highway via sensors 105. In one example embodiment, the configuration platform 109 may compare the current travel speed of one or more vehicles received via sensors 105 with the free flow speed in the travel segment to determine congestion. In another example embodiment, the configuration platform 109 may compare the current congestion length received via sensors 105 in at least one highway with the congestion length threshold to determine congestion.

In step 403, the configuration platform 109 may process and/or facilitate a processing of the traffic congestion information to determine at least one alternate travel segment that is classified in at least one second functional class. In one embodiment, the at least one second functional class is associated with one or more arterial roads. In one example embodiment, the configuration platform 109 may determine an alternate route based on the length of the congestion. The length of the congestion includes at least one starting point of the congestion, at least one ending point of the congestion, or a combination thereof. Then, the configuration platform 109 may determine alternate routes in one or more arterial roads located between the start point of the traffic congestion and the end point of the traffic congestion. In one scenario, the configuration platform 109 may take into account current utilization of arterial roads, pedestrian traffic information, or a combination thereof while selecting alternate routes.

In step 405, the configuration platform 109 may determine at least one calculated traffic flow for the at least one alternate travel segment based, at least in part, on traffic flow information associated with the at least one first functional class. In one embodiment, the at least one calculated traffic flow is determined so that the at least one calculated traffic flow is substantially comparable to at least one traffic flow associated with the at least one functional class. In another embodiment, the one or more traffic signals are further configured to indicate that one or more normal traffic signaling parameters are being overridden by the one or more traffic signaling parameters. In one example embodiment, the configuration platform 109 may synchronize the speed in at least one alternate travel segment with the speed of first functional class. The configuration platform 109 may regulate the signal phase and timing parameters in real-time for at least one physical signal controller associated with the at least one alternate travel segment to achieve the synchronization.

In step 407, the configuration platform 109 may cause, at least in part, a configuration of one or more traffic signaling parameters for the at least one alternate travel segment based, at least in part, on the calculated traffic flow. In one embodiment, the configuration of the one or more traffic signaling parameters comprises determining a signal phase, a signal timing, or a combination thereof for one or more traffic signals on the at least one alternate travel segment. In one example embodiment, the configuration platform 109 may improve the traffic flow during congestion in at least one highway by overwriting the signal controllers in arterial roads. The configuration platform 109 may make the signals in arterial roads green throughout the duration of the traffic congestion to provide continuous free flowing alternate routes.

Figure 5:
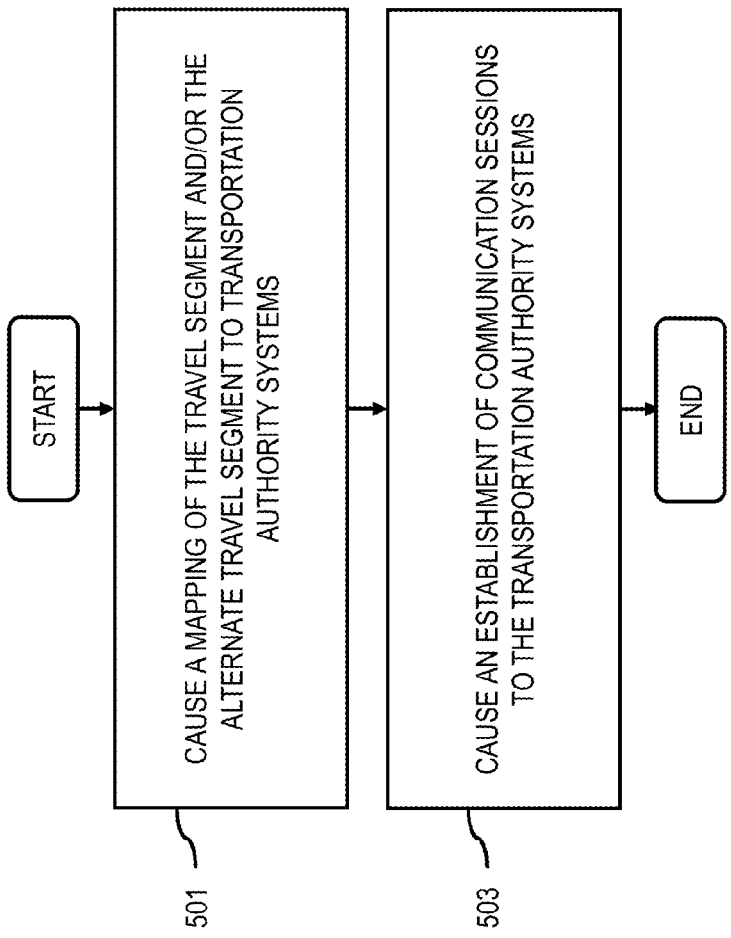
FIG. 5 is a flowchart of a process for mapping one or more travel segments to their respective transportation authority systems, according to one embodiment.

FIG. 5 is a flowchart of a process for mapping one or more travel segments to their respective transportation authority systems, according to one embodiment. In one embodiment, the configuration platform 109 performs the process 500 and is implemented in, for instance, a chip set including a processor and a memory as shown in FIG. 10.

In step 501, the configuration platform 109 may cause, at least in part, a mapping of the at least one travel segment, the at least one alternate travel segment, or a combination thereof to one or more transportation authority systems. In one example embodiment, the configuration platform 109 may connect one or more travel segments with their respective geographic authorities (e.g., department of transportation (DOT), city and/or state wide traffic agencies, etc.). In one scenario, mapping of travel segments to jurisdiction may be a database read, and may be managed in an off-line manner.

In step 503, the configuration platform 109 may cause, at least in part, an establishment of one or more communication sessions to the one or more transportation authority systems. In one embodiment, the configuration of the one or more traffic signaling parameters is performed via the one or more communication sessions. In another embodiment, the one or more transportation authority systems have connectivity to one or more physical signaling controllers. In one scenario, pursuant to the mapping of travel segments, the configuration platform 109 may first and foremost communicate any updates on the signal phase and timing parameters, the speed information, the variable sign messages, or a combination thereof with the geographic authorities. Then, the configuration platform 109 may communicate the updates with the controllers and/or the vehicles via dedicated short range communication (DSRC) alerts.

Figure 6:
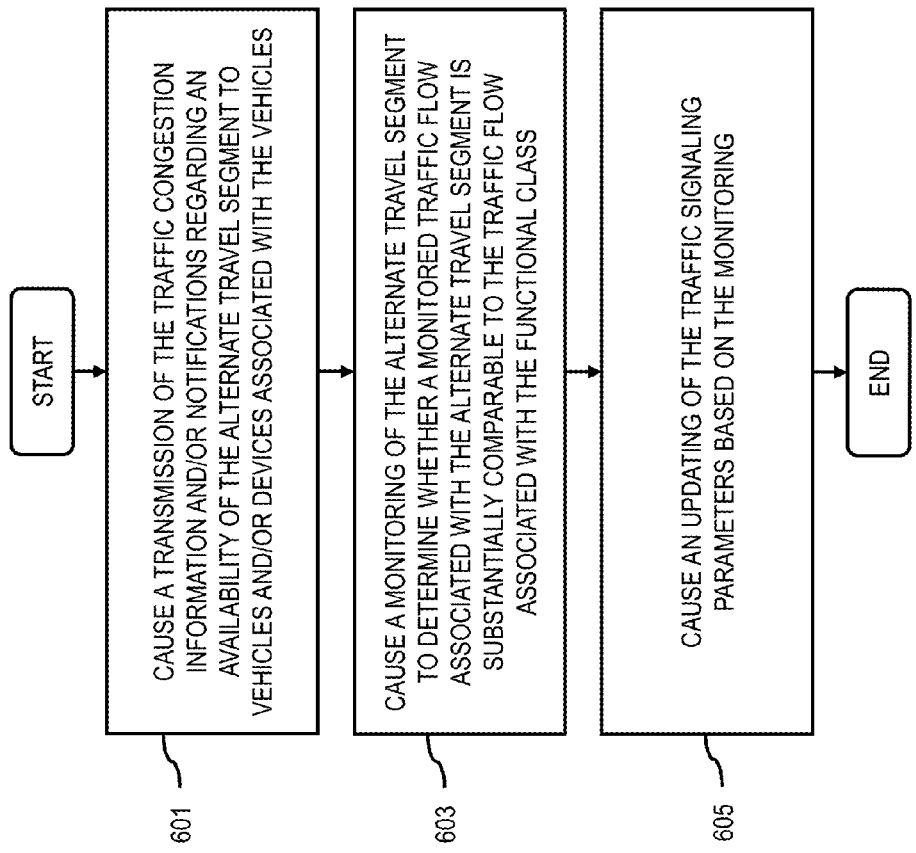
FIG. 6 is a flowchart of a process for transmitting traffic congestion information, and monitoring of alternate travel segments, according to one embodiment.

FIG. 6 is a flowchart of a process for transmitting traffic congestion information, and monitoring of alternate travel segments, according to one embodiment. In one embodiment, the configuration platform 109 performs the process 600 and is implemented in, for instance, a chip set including a processor and a memory as shown in FIG. 10.

In step 601, the configuration platform 109 may cause, at least in part, a transmission of the traffic congestion information, one or more notifications regarding an availability of the at least one alternate travel segment, or a combination thereof to one or more vehicles, one or more devices associated with the one or more vehicles, or a combination thereof. In one example embodiment, the configuration platform 109 may send notification to devices and/or devices associated with vehicles in a congested highway regarding the availability of alternate routes in nearby arterial roads. In another example embodiment, the configuration platform 109 may send notification to devices and/or devices associated with vehicles in a congested highway regarding traffic congestion information (e.g., length of the congestion) so that the drivers can make an informed decision with regards to selecting an alternative route towards his/her destination.

In step 603, the configuration platform 109 may cause, at least in part, a monitoring of the at least one alternate travel segment to determine whether at least one monitored traffic flow associated with the at least one alternate travel segment is substantially comparable to the at least one traffic flow associated with the at least one functional class. In one scenario, the configuration platform 109 may determine needed flow to achieve optimal flow rates along alternate routes and may monitor the traffic speed in the alternate routes during transitioning of the one or more vehicles from the at least one high function class road. The configuration platform 109 ensures suitable speed is maintained on alternate travel segments for user convenience.

In step 605, the configuration platform 109 may cause, at least in part, an updating of the one or more traffic signaling parameters based, at least in part, on the monitoring. In one example embodiment, the configuration platform 109 may monitor traffic speed information in the at least one high function class road. Then, the configuration platform 109 may cause an updating of the one or more traffic signaling parameters based on the monitoring.

FIG. 7 is a flowchart of a process for synchronizing traffic flow and/or traffic signals in alternate travel segments, according to one embodiment. In step 701, the configuration platform 109 may map one or more travel segments to their respective jurisdictions. In one scenario, mapping one or more travel segments to their respective jurisdictions implies that each travel segments in the map database is associated to a department of transportation (DOT), city and/or state wide traffic agency, and any other authorities. Then, in step 703, the configuration platform 109 may sense for congestion on the one or more high function class roads (e.g., highways) via any congestion sensing methods (e.g., sensors 105). In one example embodiment, the configuration platform 109 may compute the value of the current travel speed vis-à-vis free flow speed for a travel segment. If the configuration platform 109 determines that the current travel speed in comparison with the free flow speed for a travel segment is less than 0.333 (e.g., current_travel_speed/free_flow_speed<0.333), then heavy congestion may be determined along the one or more high function class roads. The configuration platform 109 continues to determine the current travel speed in comparison with the free flow speed for contiguous high function class road links. In one embodiment, the configuration platform 109 may consider contiguous travel segments for determining start points, end points, total length, or a combination thereof of the congestion (step 705). In one scenario, start points and/or end points is needed for rerouting along the one or more high function class roads. In step 707, the configuration platform 109 may determine whether the length of the congestion surpasses a congestion length threshold (e.g., 2 miles). The length of congestion is computed via summation of link lengths for contiguous highways that are congested. If the length of congestion is short (e.g., 50 m), a rerouting is not necessary. If the length of congestion surpasses the threshold then the location (i.e., latitude, longitude) of start points and end points of the congestion is recorded. Then, they are sent to the routers of low function class roads from the congestion start point till the congestion end point (step 709). Then, in step 711, upon receiving the start point and the end point, the routers finds alternate route from congestion start point to congestion end point in low function class roads. In step 713, once alternate route is determined, the configuration platform 109 may determine the needed flow for vehicles to travel on the low function class roads. If the needed flow for the new alternate route cannot be ascertained, a request for another alternate route along the low function class road is generated. Once the flow for the new route is determined, the configuration platform 109 may cause an adjustment in the signal phase and timing parameters for the physical controller of the upcoming alternate route to optimize traffic flow and safety (step 715). Effectively, broader range of physical signal controllers can adapt in a coordinated manner to abnormal traffic conditions. The configuration platform 109 adjusts to fixed speed limits and variable speed signs (VSS) along the new route. Then, the configuration platform 109 may communicate the signal detail to the respective geographic authorities (717). Before sending the new route along to upcoming vehicles, it is first communicated to the respective agencies (e.g., DOT) so that they are aware of the changes. In addition to sending the new route, the modified traffic signal parameter details, updated speed limits, are also communicated to the agencies. In step 719, the configuration platform 109 may notify one or more vehicles in the at least one high function class road regarding the alternate route in the at least one low function class road. Then, the vehicles may be sent to the newly created free flowing route. Subsequently, in step 721, the configuration platform 109 may monitor traffic flow using probes and/or other sensors to ensure that the vehicles are travelling at a reasonable speed along the newly created route. In one scenario, the configuration platform 109 may determine whether the congestion is growing or shrinking, and then adjust the alternate routes accordingly. Once congestion on the high function class road is cleared, the configuration platform 109 may return the traffic signal controllers on the low function class roads to their default setting, return fixed speed limits, and VSS messages to their default status, and then update the agencies (e.g., DOT).

Figure 8A:
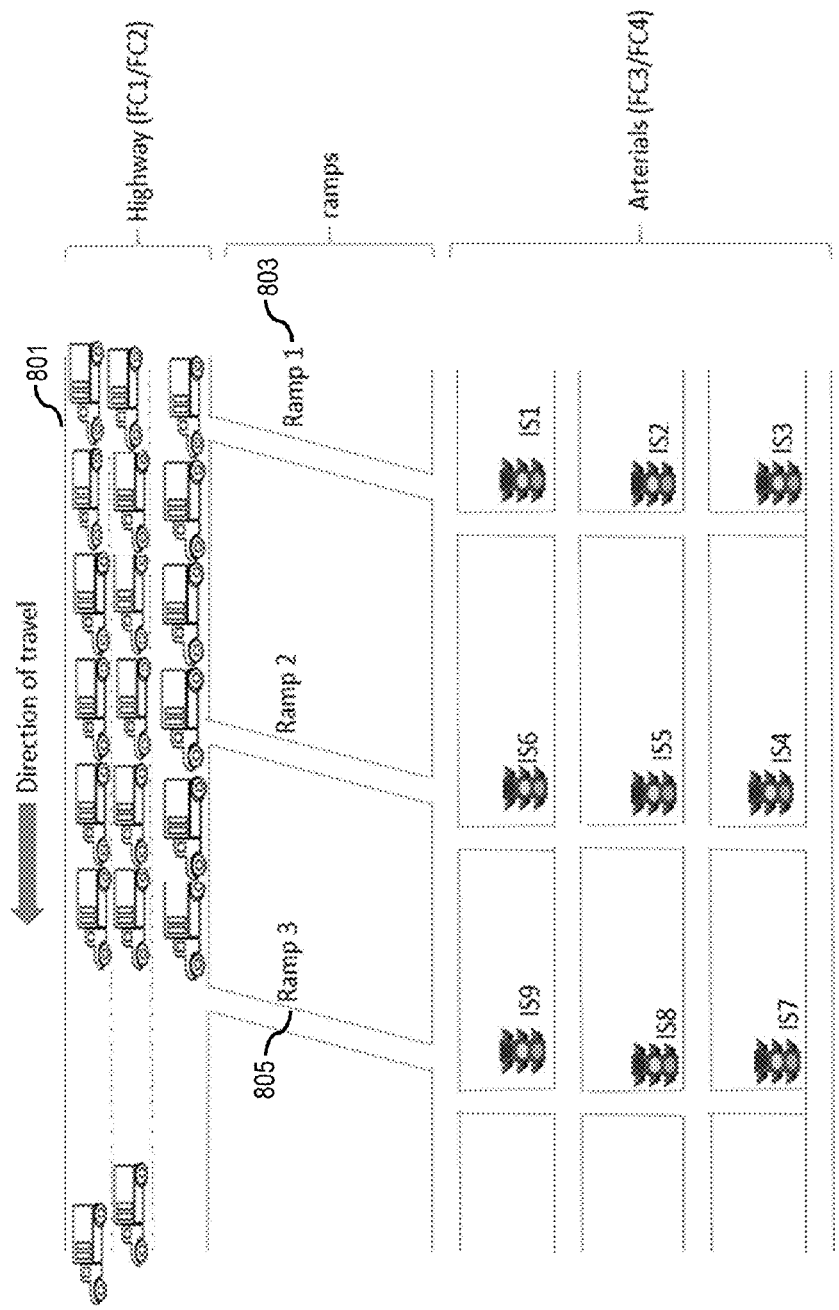
FIG. 8A is a diagram that represents a high function class road with traffic congestion, according to one example embodiment.

FIG. 8A is a diagram that represents a high function class road with traffic congestion, according to one example embodiment. In one scenario, one or more vehicles are at a standstill due to traffic congestion in highway 801 (i.e., FC1 and FC2). In one scenario, the configuration platform 109 may continuously sense for congestion in highway 801. The configuration platform 109 may observe congestion that surpasses the congestion length threshold in the vicinity of ramp 1 (803) and ramp 3 (805). Further, the configuration platform 109 may determine the starting point and the ending point for congestion in highway 801.

Figure 8B:
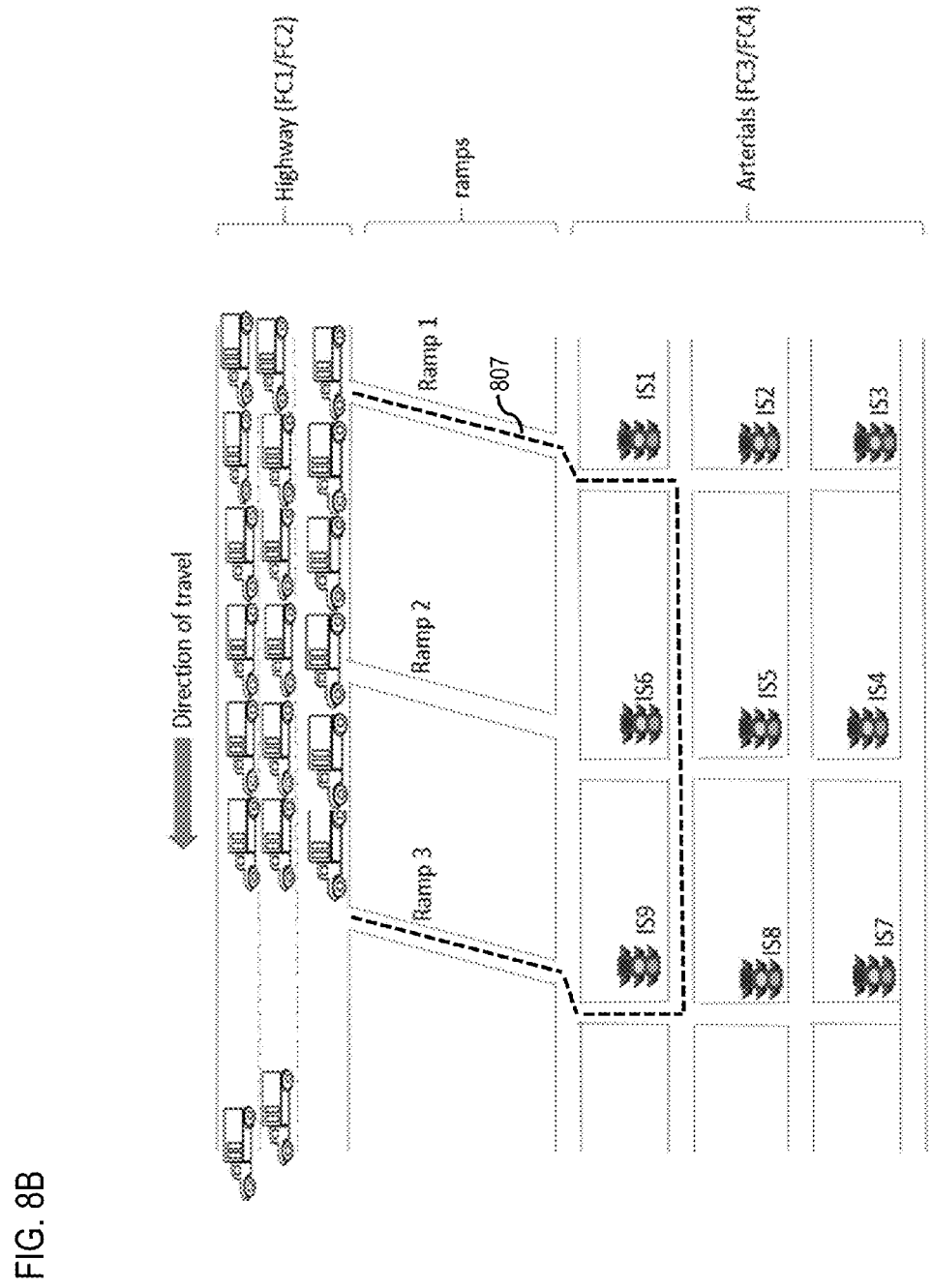
FIG. 8B is a diagram that represents an alternate route in a low function class road from a congested high function class road, according to one example embodiment.

FIG. 8B is a diagram that represents an alternate route in a low function class road from a congested high function class road, according to one example embodiment. In one scenario, the configuration platform 109 may send information on congestion length, congestion starting point, congestion ending point, or a combination thereof to the routers associated with low function class roads (e.g., FC3/FC4). In one embodiment, the FC3/FC4 router may be called the arterial router that does not consider road links on FC1/FC2. Once the new route along the FC3/FC4 travel segment is received, the configuration platform 109 may determine the needed flow for the vehicles to travel on the new FC3/FC4 route as if it was on FC1/FC2 roads. If the needed flow for the new route cannot be ascertained, the configuration platform 109 may request an alternate new route along the FC3/FC4 roads from the arterial router. In one example embodiment, the routers may compute a path along the FC3/FC4 routes based, at least in part, on congestion start point to congestion end point. Since, the starting point and the ending point of the congestion is close to ramp 1 (803) and ramp 3 (805), the routers may generate a new FC3/FC4 route (807) along the IS1, IS6, and IS9. Subsequently, the configuration platform 109 controls the traffic signals along this route (807) to ensure they remain green as long as possible to accommodate the newly arriving vehicles from the FC1/FC2 roads to FC3/FC4 roads. In one example embodiment, the configuration platform 109 may overwrite the signal controllers so that the traffic signal along the new route only shows green. This way the vehicles taken off the highway may still travel at reasonable speed in the arterial roads. In another scenario, the speed limits and VSS messages along the new route may also be updated. The newly created route along FC3/FC4 roads is broadcasted to all the vehicles travelling towards the congestion start point on FC1/FC2. Further, information about ignoring the speed limit changes along the new route is also communicated.

The processes described herein for synchronizing traffic flow and/or traffic signals in alternate travel segments may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
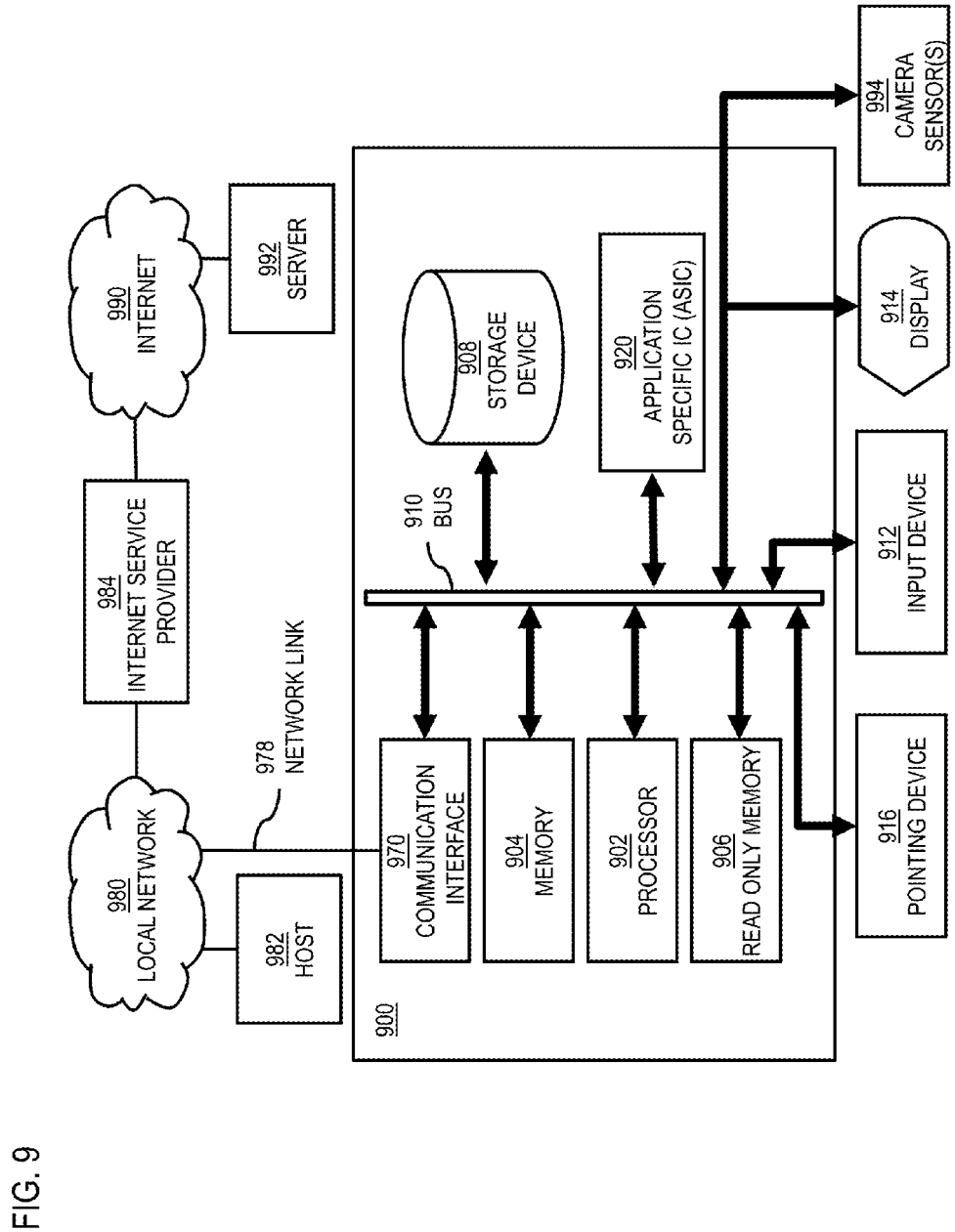
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to synchronize traffic flow and/or traffic signals in alternate travel segments as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of synchronizing traffic flow and/or traffic signals in alternate travel segments.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to synchronizing traffic flow and/or traffic signals in alternate travel segments. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for synchronizing traffic flow and/or traffic signals in alternate travel segments. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for synchronizing traffic flow and/or traffic signals in alternate travel segments, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 107 for synchronizing traffic flow and/or traffic signals in alternate travel segments to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to synchronize traffic flow and/or traffic signals in alternate travel segments as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of synchronizing traffic flow and/or traffic signals in alternate travel segments.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to synchronize traffic flow and/or traffic signals in alternate travel segments. The memory 1005 also stores the data associated with or generated by the execution of the inventive steps.

Figure 11:
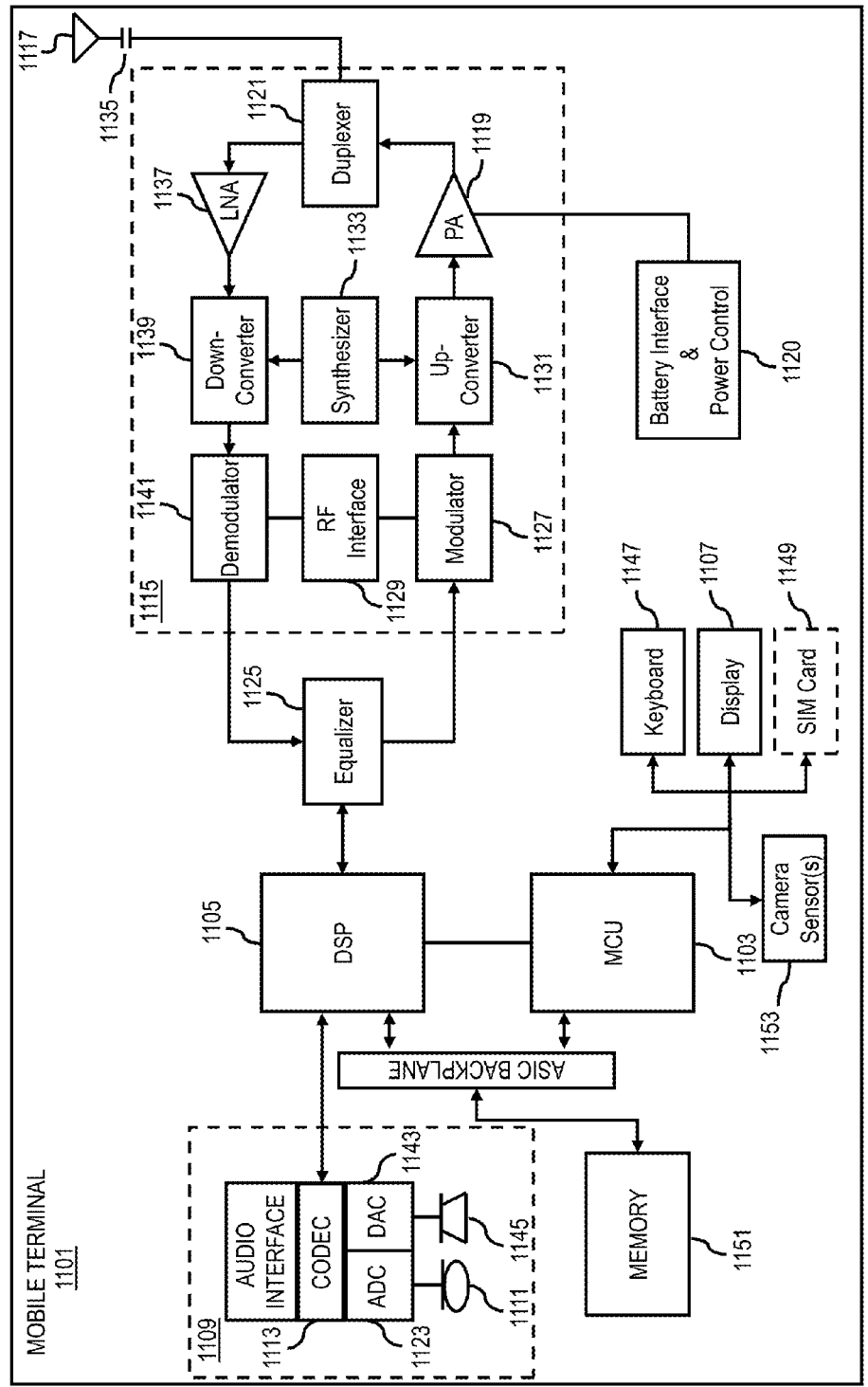
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of synchronizing traffic flow and/or traffic signals in alternate travel segments. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of synchronizing traffic flow and/or traffic signals in alternate travel segments. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to synchronize traffic flow and/or traffic signals in alternate travel segments. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining traffic congestion information for a travel segment;
   determining an alternate travel segment based on the traffic congestion information;
   mapping, respectively, the travel segment to a first jurisdiction and the alternate travel segment to a second jurisdiction, wherein the first jurisdiction is associated with a first traffic management center and the second jurisdiction is associated with a second traffic management center, and wherein the first traffic management center and the second traffic management center separately manage traffic signaling in each of the associated jurisdictions;

calculating traffic flow for the alternate travel segment based on traffic flow information associated with the travel segment; and
coordinating communication between the first traffic management center and the second traffic management center to configure one or more traffic signaling parameters for the alternate travel segment based on the calculated traffic flow.

2. A method of claim 1, further comprising:
classifying the travel segment in a first functional class; and
classifying the alternate travel segment in a second functional class,
wherein the calculated traffic flow is substantially comparable to traffic flow associated with the first functional class.

3. A method of claim 2, further comprising:
monitoring the alternate travel segment;
adjusting the one or more traffic signaling parameters to ensure the calculated traffic flow is substantially comparable to the traffic flow associated with the first functional class.

4. A method of claim 2, wherein the first functional class is associated with one or more highways, and the second functional class is associated with one or more arterial roads.

5. A method of claim 1, further comprising:
establishing one or more communication sessions between the first traffic management center and the second traffic management center,
wherein the configuration of the one or more traffic signaling parameters is performed via the one or more communication sessions.

6. A method of claim 5, wherein the first traffic management center and the second traffic management center include one or more physical signaling controllers and one or more virtual signal controllers for re-routing traffic from the travel segment to the alternate travel segment.

7. A method of claim 6, wherein one or more normal traffic signaling parameters of the one or more physical signaling controllers are overridden via the one or more virtual signal controllers.

8. A method of claim 1, further comprising:
causing, at least in part, a transmission of one or more notifications regarding an availability of the alternate travel segment to a device associated with a vehicle on the travel segment.

9. A method of claim 1,
determining, by the first traffic management center, a signal phase, a signal timing, or a combination thereof for one or more traffic signals on the alternate travel segment; and
transmitting the signal phase, the signal timing, or the combination thereof to the second traffic management center.

10. A method of claim 1, further comprising:
selecting a second alternate travel segment based on the traffic flow information; and
configuring the more or traffic signaling parameters for concurrent use of the alternate travel segment and the second alternate travel segment.

11. An apparatus comprising:
at least one processor; and
at least one memory including computer program code for one or more programs,
the at least one memory and the computer program code configured to, with the at least one processor, cause the apparatus to perform at least the following;

determine traffic congestion information for a travel segment;
determine an alternate travel segment based on the traffic congestion information;
map, respectively, the travel segment to a first jurisdiction and the alternate travel segment to a second jurisdiction, wherein the first jurisdiction is associated with a first traffic management center and the second jurisdiction is associated with a second traffic management center, and wherein the first traffic management center and the second traffic management center separately manage traffic signaling in each of the associated jurisdictions;
calculate traffic flow for the alternate travel segment based on traffic flow information associated with the travel segment; and
coordinate communication between the first traffic management center and the second traffic management center to configure one or more traffic signaling parameters for the alternate travel segment based on the calculated traffic flow.

12. An apparatus of claim 11, wherein the apparatus is further caused to perform at least the following:
classify the travel segment in a first functional class; and
classify the alternate travel segment in a second functional class,
wherein the calculated traffic flow is substantially comparable to traffic flow associated with the first functional class.

13. An apparatus of claim 11, wherein the apparatus is further caused to perform at least the following:
establish one or more communication sessions between the first traffic management center and the second traffic management center,
wherein the configuration of the one or more traffic signaling parameters is performed via the one or more communication sessions.

14. An apparatus of claim 13, wherein the first traffic management center and the second traffic management center include one or more physical signaling controllers and one or more virtual signal controllers for re-routing traffic from the travel segment to the alternate travel segment.

15. An apparatus of claim 11, wherein the apparatus is further caused to perform at least the following:
cause, at least in part, a transmission of one or more notifications regarding an availability of the alternate travel segment to a device associated with a vehicle on the travel segment.

16. An apparatus of claim 11, wherein the apparatus is further caused to perform at least the following:
monitor the alternate travel segment;
adjust the one or more traffic signaling parameters to ensure the calculated traffic flow is substantially comparable to the traffic flow associated with the first functional class.

17. An apparatus of claim 11, wherein the apparatus is further caused to perform at least the following:
select a second alternate travel segment based on the traffic flow information; and
configure the more or traffic signaling parameters for concurrent use of the alternate travel segment and the second alternate travel segment.

18. A computer-readable storage medium carrying one or more sequences of one or more instructions which, when executed by one or more processors, cause an apparatus to perform:

determine traffic congestion information for a travel segment;

determine an alternate travel segment based on the traffic congestion information;

map, respectively, the travel segment to a first jurisdiction and the alternate travel segment to a second jurisdiction, wherein the first jurisdiction is associated with a first traffic management center and the second jurisdiction is associated with a second traffic management center, and wherein the first traffic management center and the second traffic management center separately manage traffic signaling in each of the associated jurisdictions;

calculate traffic flow for the alternate travel segment based on traffic flow information associated with the travel segment; and coordinate communication between the first traffic management center and the second traffic management center to configure one or more traffic signaling parameters for the alternate travel segment based on the calculated traffic flow.

19. A computer-readable storage medium of claim 18, wherein the apparatus is further caused to:
   classify the travel segment in a first functional class; and
   classify the alternate travel segment in a second functional class,
   wherein the calculated traffic flow is substantially comparable to traffic flow associated with the first functional class.

20. A computer-readable storage medium of claim 18, wherein the apparatus is further caused to:
   establish one or more communication sessions between the first traffic management center and the second traffic management center,
   wherein the configuration of the one or more traffic signaling parameters is performed via the one or more communication sessions.

* * * * *